United States Patent
Gachot

[15] 3,666,236
[45] May 30, 1972

[54] BUTTERFLY VALVE

[72] Inventor: Jean Gachot, 179 Avenue de la Division Lerclerc, Enghien, France

[22] Filed: Mar. 2, 1970

[21] Appl. No.: 15,435

[30] Foreign Application Priority Data

| May 7, 1969 | France | 6906499 |
|---|---|---|
| May 29, 1969 | France | 6917528 |
| Aug. 4, 1969 | France | 6926718 |

[52] U.S. Cl. ............................................................251/306
[51] Int. Cl. ...........................................................F16k 1/22
[58] Field of Search..................251/306, 307, 172, 173, 171

[56] References Cited

UNITED STATES PATENTS

| 2,982,305 | 5/1961 | Grove | 251/173 X |
|---|---|---|---|
| 3,127,182 | 3/1964 | Wardleigh | 251/306 X |
| 3,346,233 | 10/1967 | Billson | 251/172 |
| 3,356,336 | 12/1967 | Maenaka | 251/306 |
| 3,528,448 | 9/1970 | Urban | 251/173 X |
| 3,552,407 | 1/1971 | Hirano | 251/306 X |
| 3,156,445 | 11/1964 | Swain | 251/171 |

*Primary Examiner*—Henry T. Klinksiek
*Attorney*—Young & Thompson

[57] ABSTRACT

A butterfly valve intended for use in a piping system and comprising a body pierced by a duct located opposite to the two sections of the piping system and a closure disc rotatably mounted on the valve body and offset laterally with respect to its axis of rotation; the valve disc is provided at its periphery with a convex annular bearing face, the valve body is fitted with an annular seal which projects into the interior of the duct and said annular bearing face constitutes a seating for the seal in the closed position. A high standard of leak-tightness in the closed position of the valve is achieved owing to the combination of the offset valve disc and of the annular projecting seal applied against the bearing face of the valve disc.

8 Claims, 15 Drawing Figures

INVENTOR
JEAN GACHOT
By Young + Thompson
ATTYS.

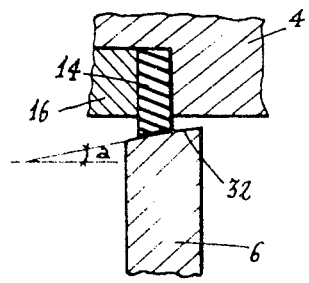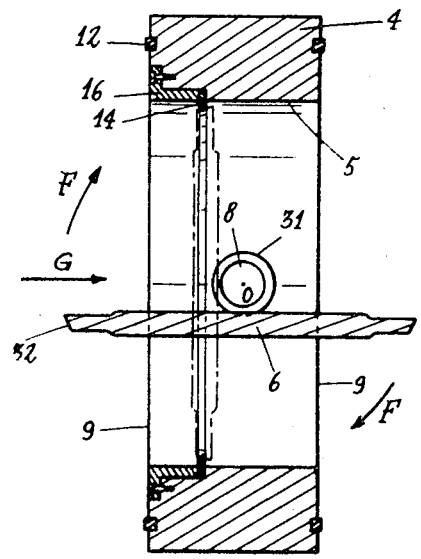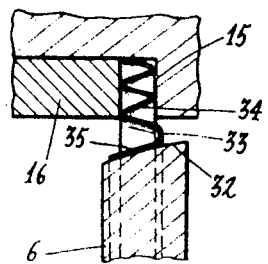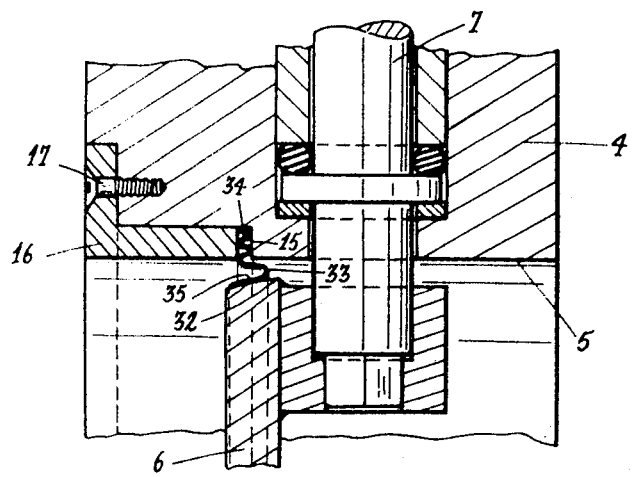

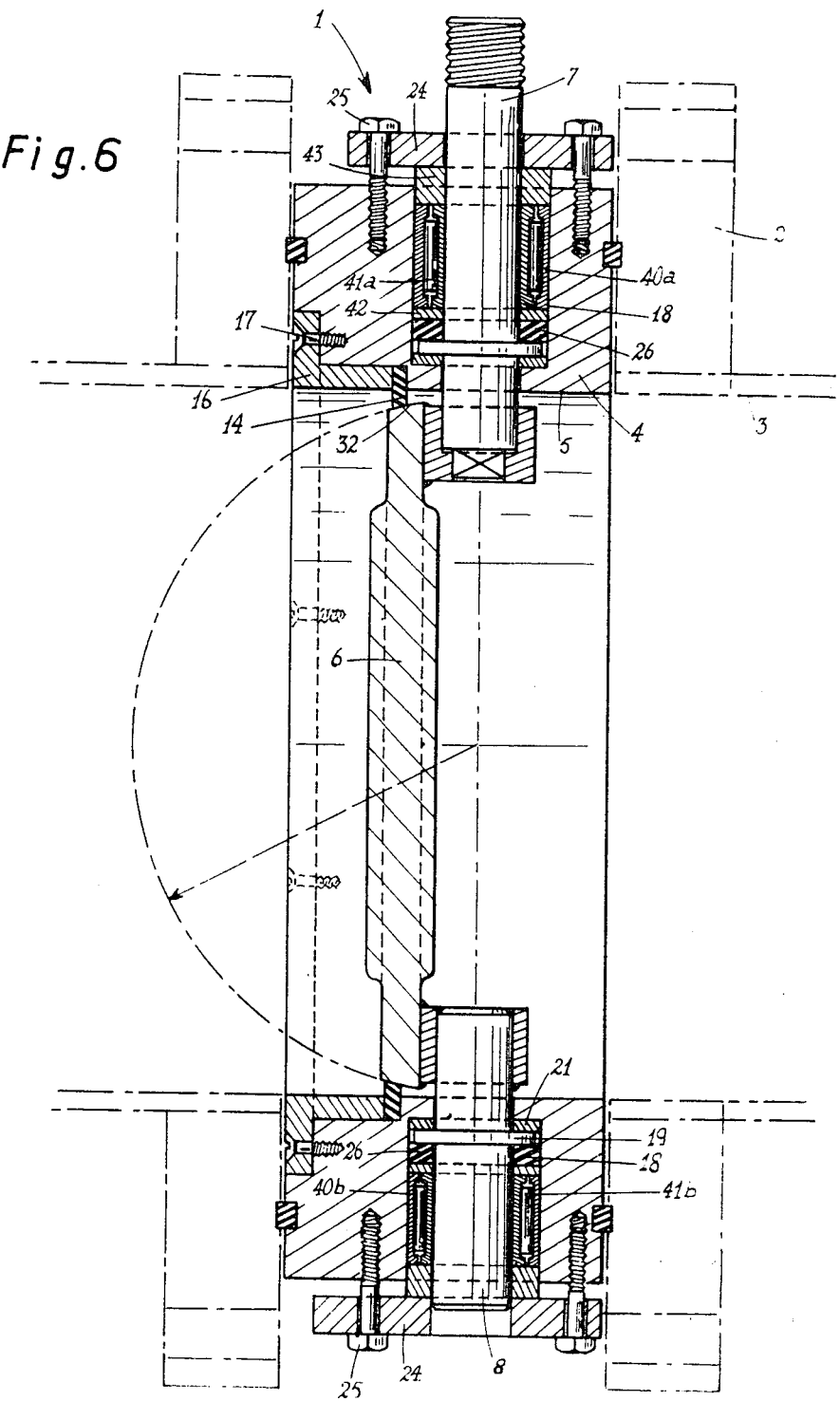

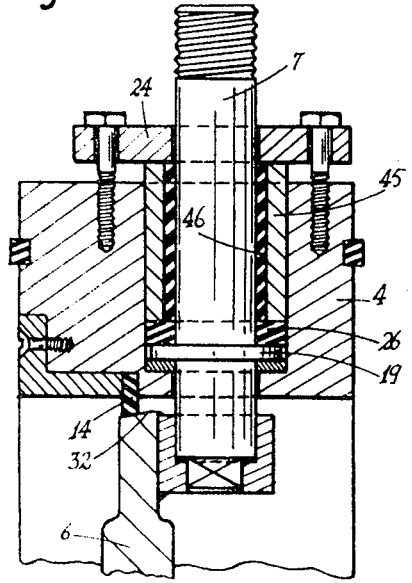
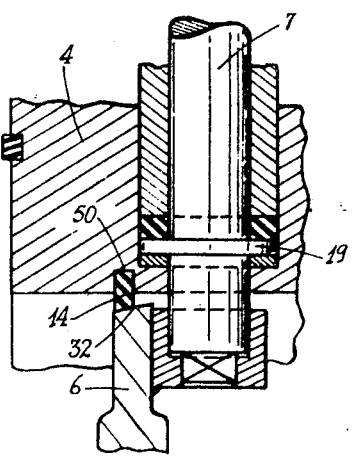
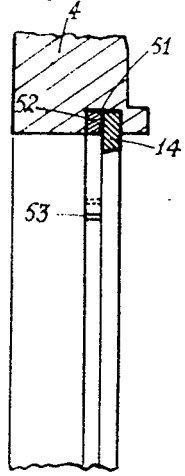
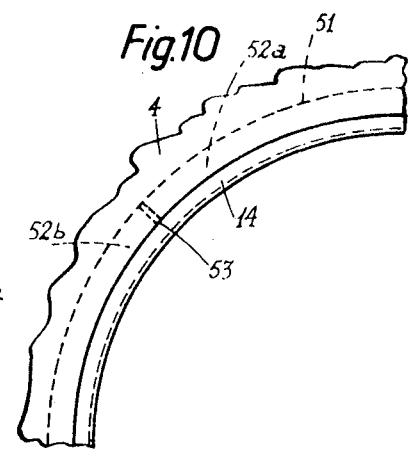
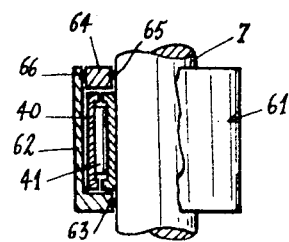
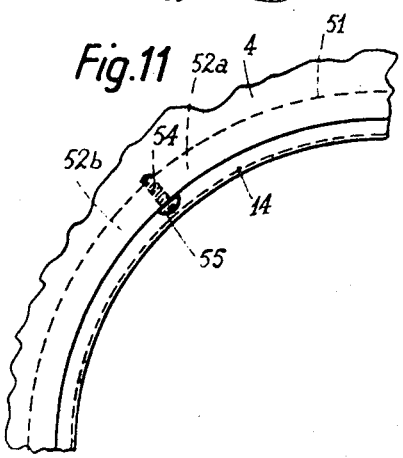

BUTTERFLY VALVE

This invention relates to an improved butterfly valve for piping systems.

In the different types of butterfly valve which are already known, the term "butterfly" designates a disc-type gate which is rotatably mounted within a pipe or duct for the flow of fluids and which is capable either of closing off said duct or of providing a free passageway.

Leak-tightness is ensured in the closed position by means of a seal or packing usually formed of rubber of of a synthesis elastomer against which the butterfly gate or disc is applied.

In some valves of this type, the disc contains its axis of rotation and in other types is offset laterally with respect to its axis of rotation.

Butterfly valves usually prove satisfactory. However, it often happens that seals or leak-tight packings have a short service life, in particular when they are subjected to high pressures or to the action of abrasive fluids. After a certain time, the valve is no longer leak-tight, thereby making it necessary to dismantle and recondition the valve. This operation is frequently costly and is liable to put the corresponding installation out of service for an appreciable period of time.

An attempt has been made to construct butterfly valves fitted with polytetrafluoroethylene seals. However, it has been proved by experience that, in the closed position, deformations of the seal take place very rapidly and result in leakage of the valve. This situation has made it necessary to abandon the use of polytetrafluoroethylene for this type of valve. As a consequence, it is not possible to contemplate the use of butterfly valves in the case of corrosive gases or liquids and this is a major shortcoming in valves of this type which otherwise have remarkable properties: virtually zero torque both at the time of opening and closing up to the immediate vicinity of the valve seat.

In accordance with the invention, the butterfly valve which is intended for use in a piping system and comprises a body pierced by a duct located opposite to the two sections of the piping system and a closure disc rotatably mounted on the valve body and offset laterally with respect to its axis of rotation is characterized in that the valve disc is provided at its periphery with a convex annular bearing face and that the valve body is fitted with an annular seal which projects towards the interior of the duct and said annular bearing face constitutes a seating for the seal in the closed position.

Experience has shown that a remarkably high standard of leak-tightness in the closed position of the valve is achieved in accordance with the invention by combining a valve disc which is displaced off-center with respect to its axis of rotation with an annular seal which projects into the interior of the valve duct and which is applied against the convex bearing face of the valve disc in the closed position.

As a preferable feature, the annular bearing face of the valve disc is constituted by a portion of sphere, the center of which is placed at the point of intersection of the duct axis and of the axis of rotation of the valve disc. A spherical profile is more effective from the point of view of fluid-tightness.

In one embodiment which is of interest in the case of corrosive products, the material which constitutes the seal is polytetrafluoroethylene or alternatively a mixture of polytetrafluoroethylene and ground glass fibers. In point of fact, polytetrafluoroethylene has very good high-temperature strength and the mixture with glass fibers has a very low coefficient of expansion. Experience has demonstrated that the combination thus achieved makes it possible to obtain leak-tightness over a long period of time even in the case of the corrosive materials mentioned above.

The seal can also advantageously be composite and comprise a metallic core coated with a layer of polytetrafluoroethylene.

In another embodiment, the disc is rotatably mounted on the valve body by means of at least one roller bearing which is clamped in position by means of the valve-disc spindle.

The torque which is produced under high pressures both at opening and closure when the valve disc is placed in the immediate vicinity of its seating is thus considerably reduced.

The roller bearing aforesaid preferably consists of a needle bearing which is thus of smaller overall size.

In yet another embodiment, the valve disc is rotatably mounted on the valve body by means of at least one bushing provided with an internal lining of tetrafluoroethylene and clamped in position on the valve-disc spindle.

The torque is also considerably reduced and overall size is limited to a minimum.

According to another feature, the annular seal which projects into the interior of the duct is inserted in a groove of the valve body which has substantially the same width as the seal, said seal being fitted in position by deformation.

The valve is thus simplified by dispensing with the use of components for clamping the seal within its recess and the cost price of the valve is reduced accordingly.

According to yet another property, the annular seal is fitted by deformation in a groove of the valve body whose width is greater than that of said seal and is retained within said groove by means of a ring of complementary width which is divided into at least two segments for the purpose of mounting said ring in said groove.

The valve is also highly simplified by virtue of the fact that the segments serve to retain the seal within the groove in a simple and effective manner.

The segments of the ring are advantageously joined together after assembly within the groove by means of at least one weld so as to couple two of their contacting extremities. When they have been fitted in position, the segments can also be locked within the groove by means of at least one screw engaged in a threaded bore which is formed in the extremities of two contacting segments. Thus, the segments cannot become dislodged from the groove and leak-tightness is effectively maintained therein.

The seal is preferably formed of either pure or filled polytetrafluoroethylene.

In another embodiment, the valve-disc seal is clamped between an annular shoulder formed by a stepped recess provided in the valve body both in the duct and in the adjacent face and a retaining ring having an annular flange which is positioned in said stepped recess.

By means of this assembly, that portion of the retaining ring which is contact with the seal can be provided if necessary with an internal diameter which is smaller than in the case of the remainder of the duct, thereby permitting very effective positional maintenance of the valve-disc seal.

According to another property, the butterfly valve in which the annular seal provided for the valve disc is mounted between an annular shoulder of the valve body and a retaining ring fitted in said body is characterized in that at least one of the surfaces which are in contact with the seal is provided with ribs forming projections in the direction of said seal.

Preferably, the ribs terminate in a sharp edge, are formed on the opposite surfaces both of the annular shoulder and of the seal-retaining ring and are arranged in staggered relation from one surface to the other. Under these conditions, excellent leak-tightness can be obtained, thereby permitting operation of the valve at high pressures and temperatures.

According to another property which can advantageously be combined with the preceding, the annular flange which surrounds the seal-retaining ring of the valve disc is provided with a projecting annular seal on that face of said annular flange which is directed towards the adjacent pipe flange.

Under these conditions, the valve-disc seal can be maintained by the clamping pressure which is transmitted to the retaining ring by the adjacent pipe flange. This results in simplification both of construction and assembly and in a reduction in capital outlay.

Further properties of the invention will become apparent from the description which is given hereinafter.

One preferred mode of execution of the invention is illustrated in the accompanying drawings which are given by way of non-limitative example, and in which:

FIG. 2 is a diametral sectional view on a smaller scale as taken along line II—II of FIG. 1 and showing the valve in the open position;

FIG. 3 is a detail sectional view on a larger scale and showing the seal in the closed position;

FIG. 4 is a partial sectional view on a different scale and corresponding to FIG. 1 in an alternative embodiment in which the seal is composite;

FIG. 5 is a sectional view on a larger scale and showing the composite seal which corresponds to FIG. 4;

FIG. 6 is a diametral sectional view taken along the axis of rotation of the valve disc and in the closed position of a valve which is fitted with needle bearings;

FIG. 7 is a radial sectional view of a valve fitted with a bushing which is provided with an internal self-lubricating lining;

FIG. 8 is a partial radial sectional view of an alternative mode of assembly of the valve-disc seal;

FIGS. 9 and 10 are respectively a radial sectional view and a corresponding partial plan view of another mode of assembly of the valve-disc seal;

FIG. 11 is a partial plan view of an alternative form of the preceding mode of assembly;

FIG. 12 is a partial half-sectional view of another alternative form;

Figure 1:
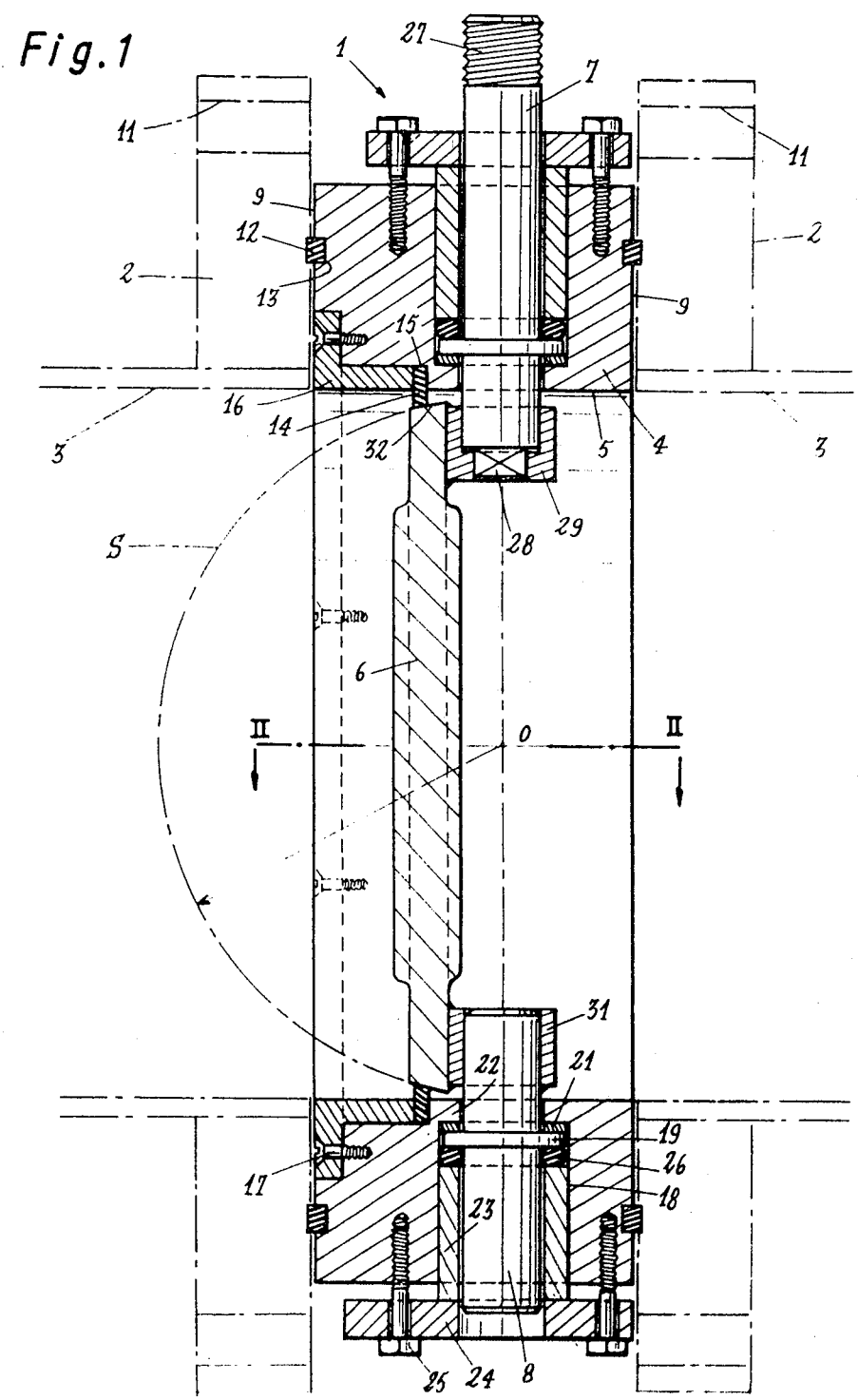
FIG. 1 is a diametral sectional view taken along the axis of rotation of the valve disc and showing the butterfly valve in the closed position.

In the example which is described with reference to FIGS. 1 to 3, the butterfly valve 1 is mounted between flanges 2 of a piping system 3. This valve comprises a body 4 through which is pierced a cylindrical duct 5 located in oppositely facing relation to the two sections of the piping system 3 and a disc 6 which is rotatably mounted on spindles 7 and 8, said spindles being located in the line of extension of each other. The valve disc 6 is offset laterally relative to the spindles 7 and 8.

The valve body 4 has two parallel end-faces 9 which are clamped between the pipe flanges 2 by means of tie bolts (not shown in the drawings) which are passed through bores 11 formed in said pipe flanges.

There is placed on each face 9 an annular packing ring 12 of polytetrafluoroethylene which is fitted in a groove 13 and projects to the exterior in order to ensure transverse leak-tightness.

An annular seal 14 which is concentric with the duct 5 is fitted between a shouldered portion 15 of the valve body 4 and a retaining ring 16 which is attached to said valve body 4 by means of countersunk-head screws 17. The seal forms within the interior of the duct 5 a slight projection of the order of 1 to 2 mm. In the example herein described, the orifice of the annular seal 14 has a frusto-conical surface.

The seal 14 is formed, for example, of polytetrafluoroethylene or alternatively and preferably of a mixture of polytetrafluoroethylene with ground glass fibers, the percentage of incorporated fiber being within the range of 12 to 18 percent. This corresponds to a material which is inert with respect to aggressive agents and which is suitable for use at high temperatures (of approximately 280° C.).

The spindles 7 and 8 which are fitted within bores 18 of the valve body 4 are each provided with an annular boss 19.

On the side nearest the duct 5, each boss 19 is abuttingly applied by means of a friction washer 21 against an annular shoulder 22 of the bore 18.

On the side which is remote from the duct 5, each boss 19 is abuttingly applied by means of a guide sleeve 23 against an end plate 24, the spacing of this latter with respect to the valve body 4 being adjusted by means of clamping screws 25.

An annular seal 26 is interposed between each boss 19 and the corresponding sleeve 23 in order to ensure leak-tightness.

An operating handle (not shown in the figures) is screwed onto the threaded extremity 27 of the spindle 7. Said spindle is rotatably coupled with the valve disc 6 by means of the driving square 28 which is engaged in a collar 29, said collar being rigidly fixed to the valve disc 6.

The central portion of the valve disc 6 is of greater thickness in order to withstand the pressure of the fluid. The valve disc is preferably constructed of stainless steel or of a corrosion-resistant metal. The disc is provided at its periphery with a convex annular bearing face 32 and this latter constitutes in the closed position a seating for the seal 14 which comes into contact with said bearing face in this position.

In the example herein described, the convex annular bearing face 32 is constituted by a portion of sphere S, the center of which is located at the point of intersection 0 of the axis of rotation of the valve disc 6 and of the axis of the duct 5. The relative positions of the seal 14 and of the bearing face 32 are such that the frusto-conical surface of the seal 14 and the bearing face 32 are tangent in the closed position (as shown in FIG. 3).

The operation and advantages of the valve herein described are as follows.

Assuming that the valve disc 6 is initially in the open position as shown in FIG. 2 and that the fluid is circulating in the direction of the arrow F, changeover to the closed position is effected by rotating the operating handle in the direction of the arrow G. The valve disc 6 which is actuated by means of the square 28 is moved into the position shown in chain-dotted lines and corresponding to FIG. 1. Motion of the disc is arrested by means of a stop which is not shown in the drawings.

The spherical bearing face 32 which is centered on the point of intersection 0 of the axis of the duct 5 and of the axis of rotation of the valve disc 6 describes in rotational motion of the disc 6 a sphere which is tangent to the frusto-conical surface of the seal 14.

During the rotation of the valve disc 6, the bearing face 32 remains in tangential contact with said frusto-conical surface of the seal 14 over all or part of its periphery and complete closure is thus effected without difficulty.

In the closed position, the pressure of the fluid which is exerted in the direction of the arrow G tends to thrust the seal 14 towards the large-diameter portion of the bearing surface 32, thereby enhancing leak-tightness. Thus, when the seal 14 is formed of polytetrafluoroethylene, said seal does not exhibit any tendency to creep at high pressure. Since the seal projects to a distance of only 1 or 2 millimeters, it does not tend to be displaced as a result of a substantial annular surface area.

The incorporation of ground glass fibers which retain an elongated structure after grinding has the surprising effect of reducing the coefficient of expansion of the mixture to a very substantial proportion of the order of two-thirds. When fabricated from this mixture, the seal 14 thus has outstanding creep strength, especially in the case of high temperatures and high pressures. The seal also exhibits good resistance to abrasive fluids.

In practice, very satisfactory results are obtained when the frusto-conical surface of the seal 14 has a semivertical angle $a$ which is substantially within the range of 6° to 10° and which is preferably equal to 8°.

It has proved in practice that, in the movement of closure under high operating pressures, the torque which tends to result in closure of the duct is insignificant up to a position which is very close to full closure. In the case of opening, the torque is of high value in the vicinity of the position corresponding to initial unseating and then very rapidly becomes insignificant.

In the case of low pressures, leak-tightness remains satisfactory when the fluid circulates in the direction opposite to the arrow G.

Finally, the butterfly valve 1 constitutes a novel element in the family of different pipe couplings which are described in U.S. Pat. No. 3,409,268 patented Nov. 5, 1968.

The valve can in fact be mounted between two flanges 2 of a piping system 3 when the diameter of the valve body 4 is smaller on the one hand than the space which is provided between two consecutive clamping tie bolts and which constitutes a passageway for the valve body 4 and is greater on the other hand than the space formed between two other consecutive tie bolts which constitute a position stop for the valve body 4.

As shown in FIGS. 4 and 5, the seal 14 can be replaced by a composite seal 33 constituted by a metallic core covered with a thin coating of polytetrafluoroethylene.

The external portion of the composite seal 33 has an undulated or wavy cross section 34, this portion being clamped at the time of assembly between the annular shoulder 15 and the retaining ring 16. In the internal portion which comes into contact with the bearing face 32 of the valve disc 6 in the closed position, the seal 33 has a cross section which corresponds to that of said bearing face and constitutes a valve seat 35. In the example illustrated, the seat 35 is spherical and concentric relative to the point 0 with the bearing face 32. The operation is similar to that of the first example.

Leak-tightness within the duct 5 is ensured by the contact which is made between the bearing face 32 and the coating of polytetrafluoroethylene which is provided on the valve seat 35.

Leak-tightness between the valve body 4 and the retaining ring 16 is ensured by the wavy corrugations 34 coated with polytetrafluoroethylene. Clamping of the wavy portion within its recess by means of the screws 17 ensures that the valve seat 35 is applied against the bearing face 32 as a result of elastic deformation of the seal 33.

The composite seal 33 has particularly good resistance to high pressures and high temperatures which can attain 300° C.

In the particular embodiment described with reference to FIG. 6, the butterfly valve 1 is mounted between the flanges 2 of a piping system 3 as in the case of FIG. 1. A cylindrical duct 5 is pierced in the valve body 4 and a valve disc 6 is rotatably mounted on the spindles 7 and 8 which are located in the line of extension of each other. The valve disc 6 is offset laterally relative to the spindles 7 and 8. An annular seal 14 which is concentric with the duct 5 is fitted in the valve body 4 and held in position by means of a retaining ring 16. The seating of the seal is constituted in the closed position by the bearing face 32 of the valve disc 6. The spindles 7 and 8 which are mounted in the bores 18 of the valve body 4 each have an annular boss 19 which is abuttingly applied by means of a friction washer 21 against an annular shoulder of the bore 18 and are each fitted with an O-ring seal 26 in order to ensure leak-tightness.

Each spindle 7 and 8 is rotatably mounted in the valve body 4 by means of a bearing 40a, 40b which is housed within the corresponding bore 18. In the example illustrated, the bearings 40a, 40b are fitted with needle rollers 41a, 41b.

Each bearing 40a, 40b which is placed between intermediate washers 42 and 43 is held in position by means of an end plate 24 which is adjustably spaced with respect to the valve body 4 by means of clamping screws 25.

This mode of assembly produces the following technical effect.

When the valve is in service and the disc is very nearly in the closed position, experience has shown that the torque which is necessary in order to open or close the valve as thus designed is reduced to a surprising extent.

Thus, in the case of a valve 200 mm in diameter which is subjected to a pressure of 20 to 25 bars, the torque which attains 25 to 30 kgm in the case of a sleeve assembly is reduced in the case under consideration to 3 to 4 kgm.

The valve can therefore be operated smoothly in the immediate vicinity of the closed position whereas in the case of conventional butterfly valves, it is precisely in this position that the efforts are considerable, which is a major drawback.

In another form of construction which is shown in FIG. 7, each spindle 7 and 8 is rotatably mounted in a bushing 45 and clamps this latter in position. Each bushing 45 which is fitted in one of the bores 18 is provided with an internal lining 46 of polytetrafluoroethylene, this material being endowed with self-lubricating properties.

By reason of the very low coefficient of friction of the spindles 7 and 8 against the linings 46, the torque in the vicinity of the position of closure of the valve disc 6 is very low and remains of the same order of magnitude as in the previous embodiment.

In another embodiment which is shown in FIG. 8, the annular seal 14 which projects into the interior of the duct is inserted in a groove 50 of the valve body 4 which has substantially the same width as the seal, said seal being fitted in position by deformation.

Experience has shown that, in the case of ordinary operating pressures and average valve diameters (of the order of 10 cm), the seal 14 which is thus inserted in the groove 50 exhibits very satisfactory resistance.

The assembly of the seal 14 is thus simplified. The capital cost of the valve is appreciably reduced by dispensing with the retaining ring 16 and the screws 17 which are shown in FIG. 6.

In another embodiment which is shown in FIGS. 9 and 10, the annular seal 14 is fitted in a groove 51 of the valve body 4, the width of said groove being greater than that of said seal. The seal 14 is fitted in the groove 51 by deformation.

A rigid ring 52, the width of which is substantially complementary to that of the seal 14, is also mounted in the groove 51 so that the seal 14 is secured within its recess when the ring has been fitted in position.

For the purpose of assembly, the ring 52 is divided into at least two segments 52a, 52b which are placed end-to-end within the groove 51 and the ring 52 is thus reconstituted after assembly.

The relative clamping of the segments 52a, 52b and of the seal 14 within the groove 51 has the effect of maintaining the segments in end-to-end relation without any attendant danger of being dislodged. The seal 14 is also securely fixed in position.

As was the case with the previous embodiment, this improvement facilitates the assembly of the seal 14 and results in low capital cost of the valve 1. The seal 14 can easily be fitted in the groove 51 and the width of this latter makes it possible to reduce the deformation which is necessary.

In another improvement which is shown in FIGS. 9 and 10, the segments of the ring are joined to each other after fitting in the groove 51 by means of at least one weld which is applied along the line of contact 53, for example, so that two contiguous extremities of said segments are thus rigidly coupled together.

The segments are thus in no way liable to escape from the groove and the seal 14 is effectively retained therein.

In another embodiment which is shown in FIG. 11, an internally threaded bore 54 is formed in the contiguous extremities of two segments 52a, 52b. A screw 55 is engaged in the threaded bore 54, the diameter of said screw being chosen so that it tends to separate the two extremities of the segments 52a, 52b and thus take up any play which exists between all the segments.

It is thus ensured that the segments cannot escape from the groove 51 and that the seal 14 cannot be dislodged.

In all the forms of construction which are described in the foregoing, the seal 14 is advantageously made of polytetrafluoroethylene (PTFE), this product being employed either in the pure state or combined with fillers.

In yet another alternative form which is shown in FIG. 12, the valve comprises a stainless steel casing 61 which completely isolates the retainer cage of the roller bearing 40 from the point of view of fluid-tightness. To this end, the casing 61 comprises a cup 62 which is in contact with the spindle 7 by means of an O-ring seal 63. The cup 62 is closed by means of an annular cover 64 fitted with two O-ring seals 65, 66 which complete the intended arrangements for ensuring fluid-tight closure. The casing 61 can advantageously be filled with grease, thereby ensuring excellent protection of the roller bearing 40.

Figure 13:
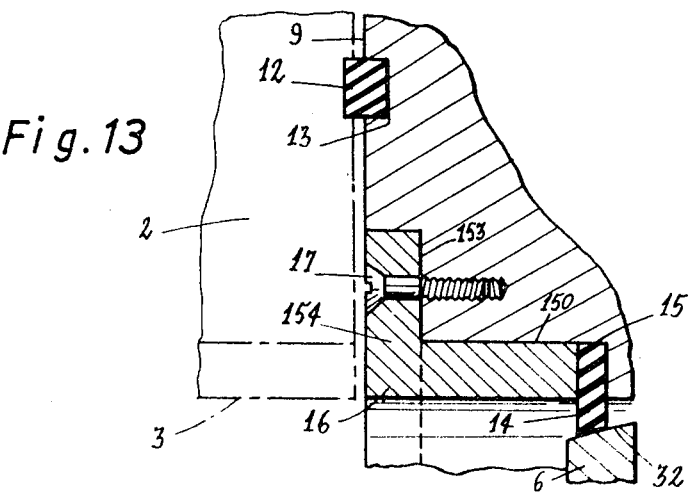
FIG. 13 is a large-scale diametral sectional view taken along the axis of rotation of the valve disc and showing that portion of the valve body which comprises the seal and the adjacent retaining ring.

In the embodiment of FIG. 13, a part of the valve body which is described in FIG. 1 is shown at 4, an annular recess 150 being machined in said body so as to form a shoulder 15, the annular seal 14 which is provided for the spherical bearing face 32 of the valve disc 6 being applied against said shoulder.

The machined recess 150 is surrounded by a second annular recess 153 formed in that face of the valve body 4 which is directed towards the pipe flange 2. A complementary annular flange 154 is formed on the retaining ring 16 and is intended to be positioned within the annular recess 153. Attachment of the elbowed member which is formed by the retaining ring 16 and the annular flange 154 is carried out by means of screws 17 as in FIG. 1. By means of this mode of assembly, which can be carried out very easily and rapidly, the seal 14 can also be very readily replaced.

Figure 14:
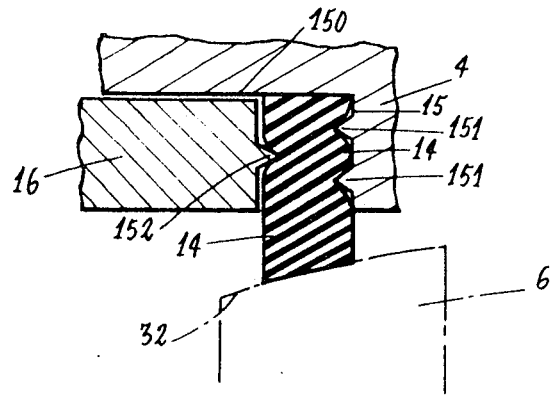
FIG. 14 is a partial view which is similar to the preceding but on a larger scale and showing an improved construction.
Figure 15:
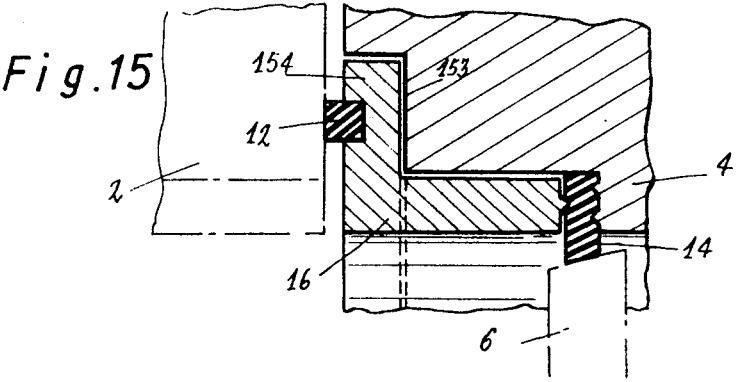
FIG. 15 is a view which is similar to FIG. 13 showing a preferred construction of the retaining ring and of the associated seals.

As seen in FIGS. 13–15, the ring 16 is L-shaped in cross section, and the recesses 150 and 153 together define a recess that is L-shaped in cross section.

The annular shoulder 15 is provided with ribs 151 which are directed towards the seal 14. At least one complementary rib 152 which is also directed towards the seal 14 is formed on the bearing surface 16a of the retaining ring 16. The ribs 151 and 152 are preferably of prismatic shape and each have a sharp edge which is intended to compress the seal 14. It is also preferably ensured that the ribs 151 and 152 are arranged in staggered relation.

Under these conditions, when the retaining ring 16 is pressed towards the shouldered portion 15, said ring accordingly flattens the seal 14 by compression. The ribs 151, 152 deform said seal elastically and concentric sealing zones are thus obtained.

In accordance with another property which can advantageously be combined with the preceding, the recess 153 of the valve body 4 is dimensioned so that the annular flange 154 which is formed laterally around the retaining ring 16 can be mounted with slight play (as shown in FIG. 14). Moreover, said annular flange 154 is adapted to carry the projecting packing ring 12 which is inserted in the free face of said flange.

Under these conditions, the seals 12 and 14 can be fitted very simply and rapidly. It is thus only necessary after positioning the valve body 4 to engage the annular flanges 154 within the machined recesses 153 on each side, this operation being performed without either tools or adjustment.

When the valve body 4 is clamped between the adjacent pipe flanges, the seals 12 and 14 are compressed to a sufficient extent to ensure leak-tightness.

In all cases, it is found when operating the valve that the clamping force exerted between the conical seal and the spherical bearing face of the valve disc is of a very low order. Nevertheless, the valve remains leak-tight under very high pressures. Thus, a valve having a diameter of 50 mm is capable of withstanding without leakage a pressure of the order of 40 kg/cm$^2$ while nevertheless permitting substantial mobility of the valve disc, which is a surprising result.

What I claim is:

1. In a butterfly valve for use in a piping system and which comprises a body pierced by a duct to be located between two sections of the piping system and a closure disc rotatably mounted on the valve body and offset laterally with respect to its axis of rotation, wherein the valve disc is provided at its periphery with an annular bearing surface and wherein the valve body has an annular seal which projects into the interior of the duct for engagement with said annular bearing surface, when said disc is in the closed position; the improvement in which the valve-disc seal is clamped between an annular shoulder formed by a stepped recess in the valve body both in the duct and in the adjacent face and a retaining ring having an annular flange which is positioned in said stepped recess, said stepped recess being L-shaped in cross section, said retaining ring being L-shaped in cross section, said annular flange having a projecting annular seal on that face of said annular flange which is directed towards the adjacent pipe section.

2. A valve as claimed in claim 1, in which the material of said first-mentioned seal is polytetrafluoroethylene.

3. A valve as claimed in claim 1, in which the material of said first-mentioned seal is a mixture of polytetrafluoroethylene and glass fibers.

4. A valve as claimed in claim 1, at least one of said annular shoulder and retaining ring having thereon ribs forming projections that indent the first-mentioned seal.

5. A valve as claimed in claim 4, in which said ribs terminate in sharp edges.

6. A valve as claimed in claim 4, said ribs being formed both on said annular shoulder and on said retaining ring.

7. In a butterfly valve for use in a piping system and which comprises a body pierced by a duct to be located between two sections of the piping system and a closure disc rotatably mounted on the valve body and offset laterally with respect to its axis of rotation, wherein the valve disc is provided at its periphery with an annular bearing surface and wherein the valve body has an annular seal which projects into the interior of the duct for engagement with said annular bearing surface, when said disc is in the closed position; the improvement in which the valve body has a double-stepped annular recess at one end of said duct, said double-stepped recess comprising two radial shoulders and two peripheral faces, said annular seal resting on the inner of said shoulders, and tightening means for tightening said seal against said inner shoulder, said tightening means comprising a ring comprising a tubular part slidable within the inner of said peripheral faces, the end of said tubular part being in contact with said seal, said ring having an outwardly extending annular flange on the end thereof opposite the end that contacts said seal, the last-named flange being housed at least partially between the outer peripheral face and the outer radial shoulder of said recess, the face of said last-mentioned flange opposite said outer radial shoulder having a seal fitted therein and projecting therebeyond to contact and seal with an adjacent pipe section.

8. A valve as claimed in claim 7, at least one of the first-mentioned end of said tubular part and said inner radial shoulder having ribs thereon forming projections that indent the first-mentioned seal.

* * * * *

UNITED STATES PATENT OFFICE
CERTIFICATE OF CORRECTION

Patent No. 3,666,236  Dated May 30, 1972

Inventor(s) Jean Gachot

It is certified that error appears in the above-identified patent and that said Letters Patent are hereby corrected as shown below:

On the cover sheet [30] heading "Foreign Application Priority Data" change "May 7, 1969" to -- March 7, 1969 --.

Signed and sealed this 7th day of November 1972.

(SEAL)
Attest:

EDWARD M. FLETCHER, JR.
Attesting Officer

ROBERT GOTTSCHALK
Commissioner of Patents